(12) United States Patent
Kumar

(10) Patent No.: US 6,728,606 B2
(45) Date of Patent: Apr. 27, 2004

(54) METHOD FOR DETECTING A LOCKED AXLE CONDITION

(75) Inventor: Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/066,233

(22) Filed: Jan. 31, 2002

(65) Prior Publication Data

US 2003/0144770 A1 Jul. 31, 2003

(51) Int. Cl.[7] .............................. G06F 7/00; B60T 8/88
(52) U.S. Cl. ........................................... 701/19; 701/29
(58) Field of Search ................... 701/19, 29, 34

(56) References Cited

U.S. PATENT DOCUMENTS

| | | | | |
|---|---|---|---|---|
| 5,290,095 A | * | 3/1994 | Wood et al. | 303/133 |
| 5,357,181 A | * | 10/1994 | Mutoh et al. | 318/139 |
| 5,629,567 A | * | 5/1997 | Kumar | 290/3 |
| 5,990,648 A | | 11/1999 | Kumar et al. | 318/490 |
| 6,271,637 B1 | * | 8/2001 | Kushion | 318/434 |

* cited by examiner

Primary Examiner—Michael J. Zanelli
(74) Attorney, Agent, or Firm—Cantor Colburn LLP

(57) ABSTRACT

A method for detecting a locked axle condition in a vehicle having a traction motor including obtaining a traction motor signal having at least one phase, wherein the traction motor signal is responsive to the operating condition of the traction motor, processing the traction motor signal so as to create an indication result signal, and examining the indication result signal so as to determine if a locked axle condition exists.

19 Claims, 6 Drawing Sheets

Elapsed Time Between Events

Band Pass Filter

Fourier Series

METHOD FOR DETECTING A LOCKED AXLE CONDITION

BACKGROUND

This invention relates generally to a method for detecting a locked axle condition for a vehicle and more particularly to a method for detecting a locked axle condition for an AC locomotive which is propelled by AC traction motors.

Locomotives used for hauling applications are generally equipped with speed sensors coupled to individual traction motors or to the axles driven by the traction motors. The speed sensor data or speed sensor information is monitored and used to detect a locked axle condition. If a locked axle condition occurs on a given axle while the locomotive is moving, the respective rotational axle speed will decrease to zero, while the remaining axles will continue to rotate at the speed corresponding to the speed of the locomotive. This locked axle condition will cause the axle wheel to slide along the rail and could adversely affect the handling characteristics of the locomotive. Thus, the speed sensor can usually detect a locked axle condition whenever a substantial difference in speed exists in one axle relative to the remaining axles.

When a locked axle is detected the locomotive operator generally has to stop the locomotive and inspect the axle for any visual damage. If there is no visual damage to the axle, then the locomotive is moved slightly in order to ascertain if the axle is in fact locked or if the detection of the locked axle is a false detection caused by a failure in the speed sensor. Using the current method of detecting a locked axle, when a locked axle condition is detected due to a failure in the speed sensor, the locked axle speed sensor and/or speed detection system is disabled and the locomotive is operated at a lower speed limit until the locked axle speed sensor and/or speed detection system can be repaired.

Unfortunately, this method has a number of disadvantages. One disadvantage is that stopping locomotives, inspecting axles and operating at slower speeds involve burdensome delays and can be expensive. A second disadvantage of this method is that it allows a large amount of electric power to be lost when an axle becomes locked. This is because the traction motor is driven by power supplied to the traction motor by the locomotive. When an axle becomes locked power is still supplied by the locomotive to drive the traction motor and this power becomes lost in the semiconductor devices of the traction motor. A third disadvantage is that if any of the electronic components of the locked axle speed sensor and/or speed detection system fails then locked axle detection is not possible. If the sensors do not function correctly, then a locked axle condition may occur without being detected.

Therefore, there is a need for a low-cost method to reliably determine when a locked axle condition occurs in a vehicle wherein the losses in the power semiconductors are minimized and wherein the method does not rely solely on axle speed sensors for locked axle detection.

SUMMARY

A method for detecting a locked axle condition in a vehicle having a traction motor comprising: obtaining a traction motor signal having at least one phase, wherein the traction motor signal is responsive to the operating condition of the traction motor, processing the traction motor signal so as to create an indication result, and examining the indication result so as to determine if a locked axle condition exists.

BRIEF DESCRIPTION OF THE DRAWINGS

The above discussed and other features and advantages will be appreciated and understood by those skilled in the art from the following detailed description and drawings, wherein like elements are designated by like numerals in the several figures.

Referring now to the drawings.

DESCRIPTION OF AN EXEMPLARY EMBODIMENT

It should be noted that although an exemplary embodiment is illustrated hereinbelow with regards to a locomotive, it is considered within the scope this embodiment that the method may be applied to any vehicle 1 or device having a motor which produces a back electromotive force (EMF).

Figure 1:
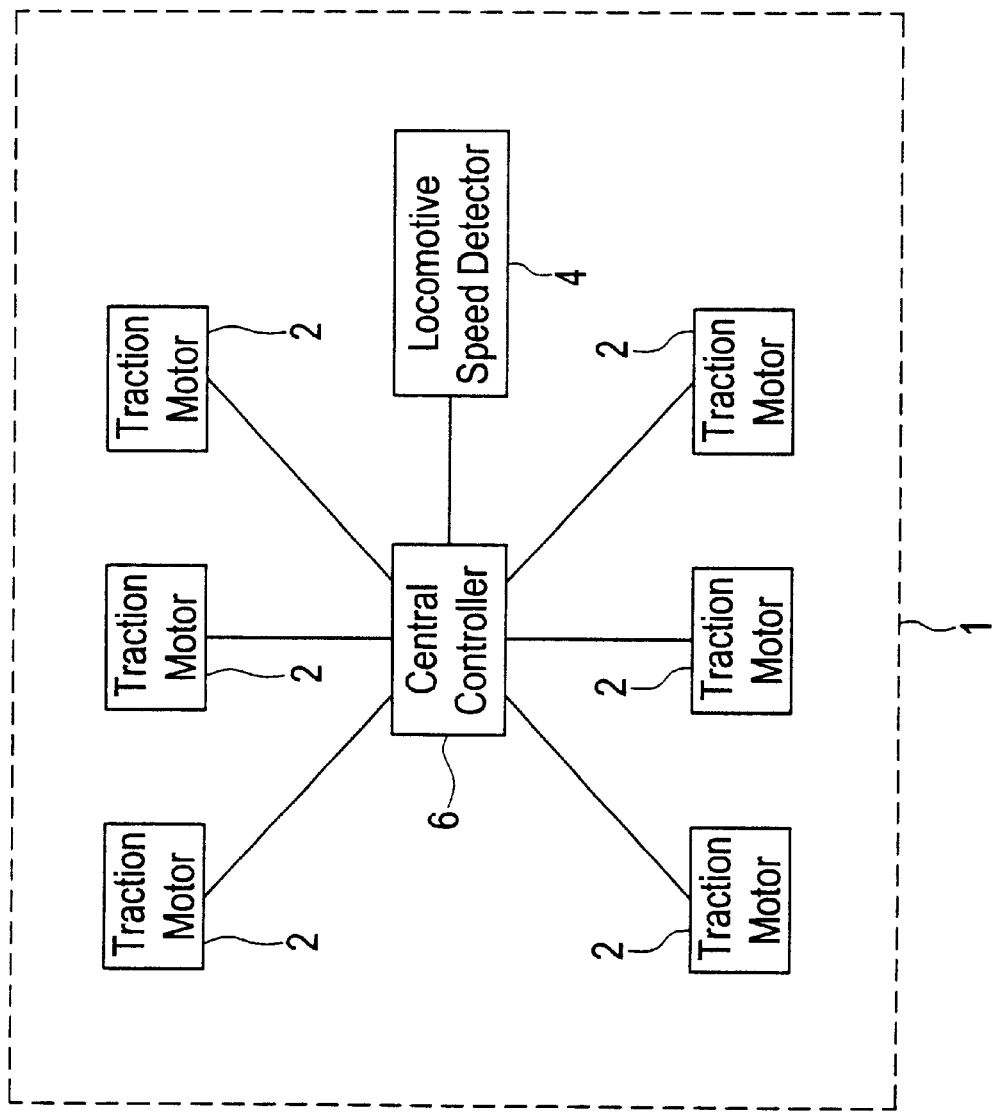
FIG. 1 is an overall system schematic of an AC locomotive in accordance with an exemplary embodiment.
Figure 2:
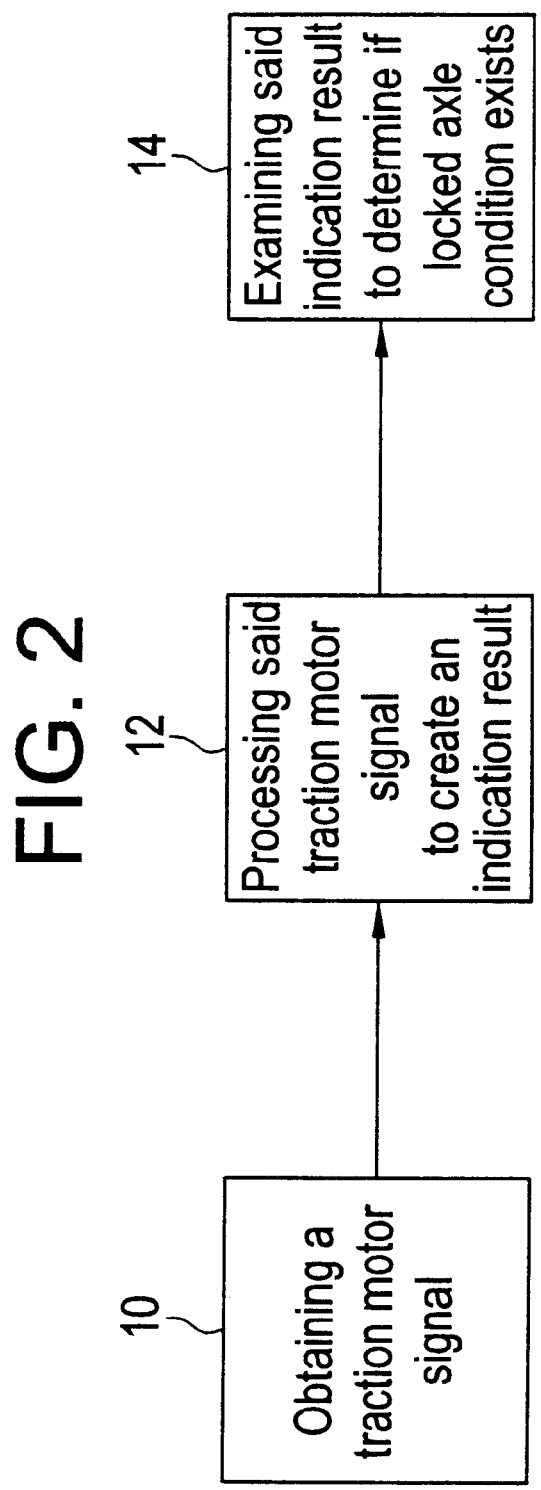
FIG. 2 is a flow diagram describing an overall embodiment of a method for detecting a locked axle condition in a vehicle in accordance with an exemplary embodiment.

Referring to FIG. 1 and FIG. 2, an overall method for detecting a locked axle condition in a vehicle 1 having a traction motor 2, a locomotive speed detector 4 and a central controller 6 is discussed. In accordance with an exemplary embodiment, central controller 6 is preferably communicated with traction motor 2 and locomotive speed detector 4. In accordance with an exemplary embodiment, locomotive speed detector 4 may use speed information from all axles and/or combine speed information for other axles with other sources of speed information, such as RADAR, GPS, to obtain the best approximation of the speed at which vehicle 1 is traveling.

Referring to FIG. 2, while vehicle 1 is operating, central controller 6 obtains a traction motor signal from traction motor 2 as shown in step 10, wherein the traction motor signal is preferably responsive to the back Electromotive Force (EMF) of traction motor 2. If the speed of vehicle 1 is determined to be lower than expected, central controller 6 processes the traction motor signal so as to create an indication result, as shown in step 12. In accordance with an exemplary embodiment, the indication result is preferably responsive to the magnitude and/or frequency of the traction motor signal. The indication result is then examined so as to determine if a locked axle condition exists, as in step 14. In accordance with an exemplary embodiment, although the overall method for detecting a locked axle condition described hereinabove is described as being implemented based on the speed of vehicle 1, it is considered within the scope of the embodiment that the overall method described hereinabove may be implemented for any reason suitable to the desired end purpose.

In accordance with an exemplary embodiment, a locked axle condition is determined to have occurred if the following condition occurs. If either the magnitude and/or the frequency of the indication result for a particular traction motor 2 is either zero or substantially different from the other axles, then it is considered unknown if a locked axle exists and a locked axle condition is assumed to have occurred for that particular axle. However, if both the magnitude and frequency of an indication result for a particular axle are substantially the same as the other axles on vehicle 1, then it is determined that a locked axle condition has not occurred and does not exist for that particular axle.

Figure 3:
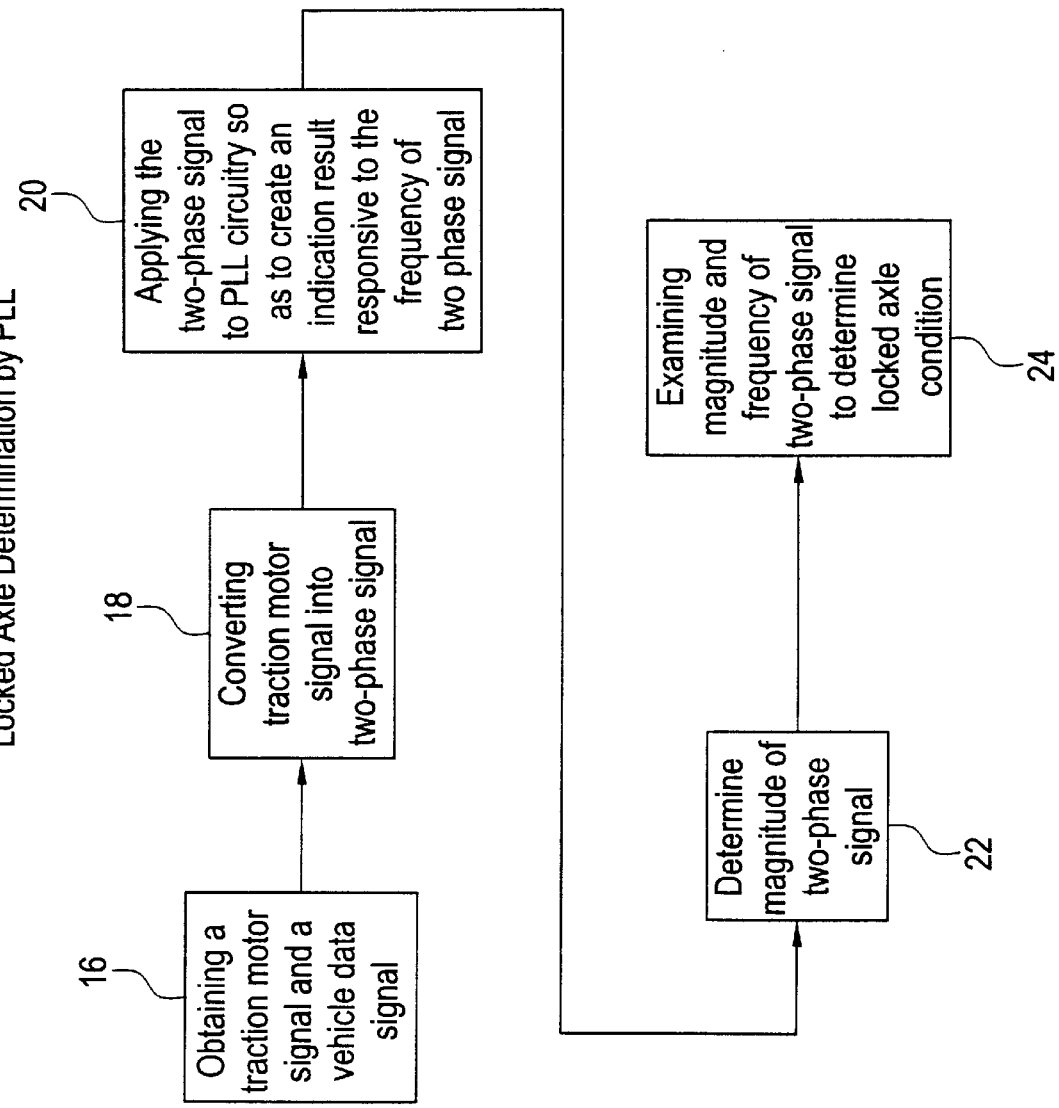
FIG. 3 is a flow diagram describing a first embodiment of a method for detecting a locked axle condition in a vehicle in accordance with an exemplary embodiment.

In accordance with an exemplary embodiment, there are a variety of ways to apply the method as discussed herein. These are discussed as follows. Referring to FIG. 3, a first embodiment is discussed. In accordance with a first embodiment, a traction motor signal and at least one vehicle data signal are obtained from vehicle 1 as shown in step 16. The traction motor signal is then converted into a two-phase signal as shown in step 18. In accordance with an exemplary embodiment, traction motor signal may be converted into a two-phase signal using any device, circuitry or method known in the art and suitable to the desired end purpose. Also, in accordance with an exemplary embodiment, any balanced three-phase signal may be transformed into a balanced two-phase signal using any available techniques suitable to the desired end purpose.

The two-phase signal derived from the back EMF is then applied to phase locked loop (PLL) circuitry so as to create an indication result which is responsive to the frequency of the two-phase signal as in step 20. This maybe done by applying the two-phase signal derived from the back EMF to PLL circuitry so as to create a PLL signal responsive to the frequency of the two-phase signal. This PLL signal is then used to create a two-phase unity signal responsive to the frequency of the PLL signal. The unity signal is then combined with the two-phase signal derived from the back EMF so as to create an indication result responsive to the frequency error of the unity signal and/or the two-phase signal derived from the back EMF. In accordance with an exemplary embodiment, the unity signal may be created using any method suitable to the desired end purpose. Also, in accordance with an exemplary embodiment, the unity signal and the two-phase signal derived from the back EMF may be combined using any combination technique or method suitable to the desired end purpose.

In addition, the two-phase signal derived from the back EMF is further examined so as to create an indication result which is responsive to the magnitude of the two-phase signal as in step 22. This may be done by using the unity signal to resolve the two-phase signal derived from the back EMF to generate an indication result responsive to the magnitude of the two-phase signal derived from the back EMF. The indication result that is responsive to the magnitude of the two-phase signal derived from the back EMF and the indication result that is responsive to the frequency of the unity signal and/or the two-phase signal derived from the back EMF are then examined, as in step 24, so as to determine if a locked axle condition exists. If a steady magnitude exists then the frequency generated by the PLL circuitry corresponds to the frequency of the back EMF which is proportional to the speed of traction motor 2. Therefore, if the determined frequency is substantially lower than the speed of vehicle 1, then a locked axle is indicated. If the magnitude of the signal is not steady then the determined frequency may be in error (for example, due to noise) and a possible locked axle condition is assumed.

Figure 4:
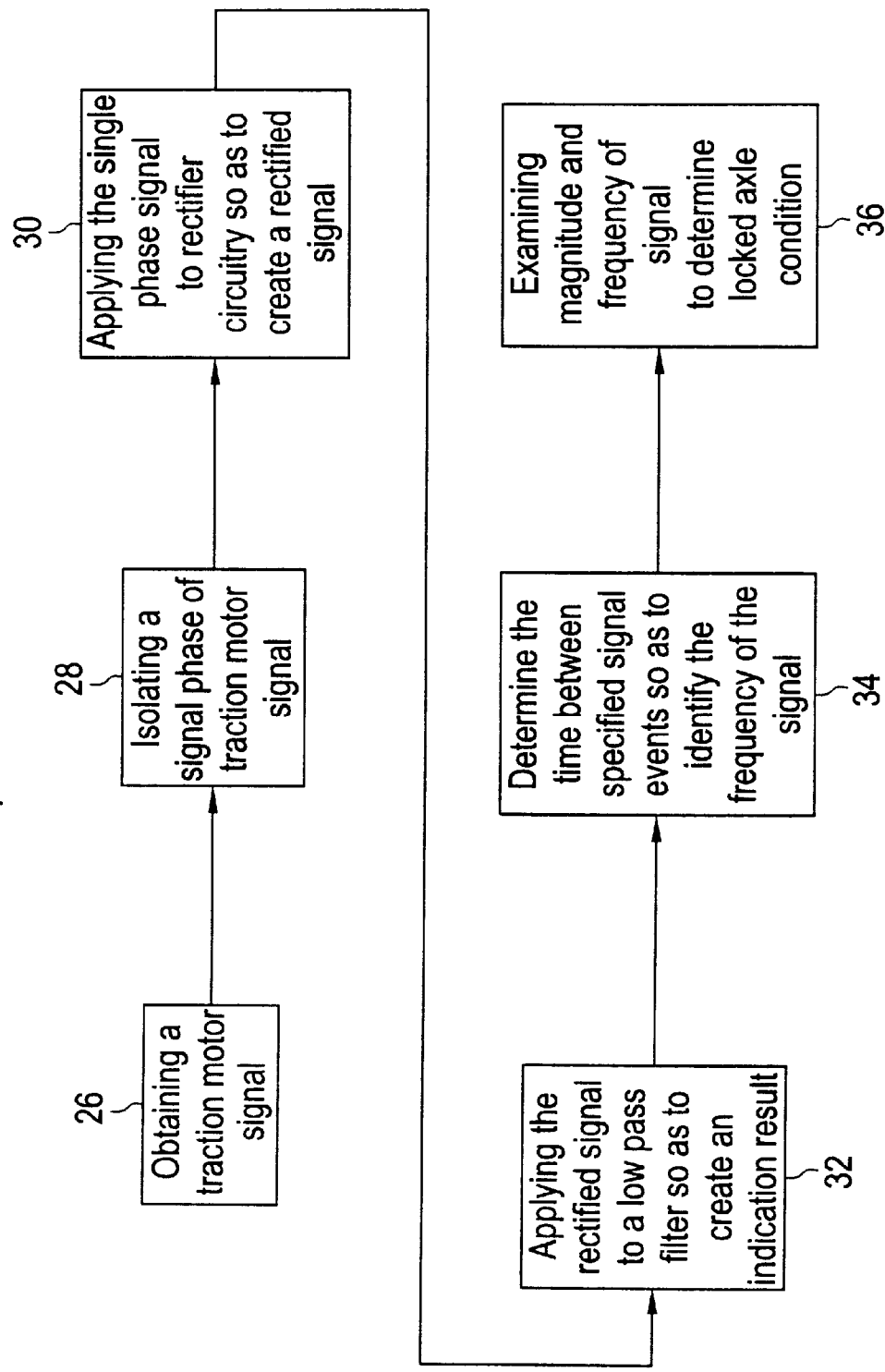
FIG. 4 is a flow diagram describing a second embodiment of a method for detecting a locked axle condition in a vehicle in accordance with an exemplary embodiment.

Referring to FIG. 4, a second embodiment is discussed. In accordance with a second embodiment, a traction motor signal is obtained as in step 26 and a single phase of the traction motor signal is isolated as in step 28. This phase is then applied to a signal rectifier so as to create a rectified signal as in step 30. This rectified signal is then applied to a low pass filter so as to create an indication result responsive to the magnitude of the rectified signal as in step 32. In addition, the traction motor signal is examined so as to determine the time between a predetermined specified signal event (i.e. zero crossings, peak-to-peak). This allows for the creation of an indication result responsive to the frequency of the traction motor data signal as in step 34. The indication result responsive to the magnitude of the rectified signal and the indication result responsive to the frequency of the traction motor signal are then examined so as to determine if a locked axle condition exists, as in step 36.

In accordance with an exemplary embodiment, the rectifier may be any rectifying device, method or circuitry known in the art and suitable to the desired end purpose. Also, low pass filter may be any low pass filtering device, method or circuitry known in the art and suitable to the desired end purpose.

It is considered within the scope of an exemplary embodiment that the magnitude and/or frequency of the back EMF signal may be determined using a single phase or multiple phases of the back EMF signal. It is also considered within the scope of an exemplary embodiment that all three phases of the back EMF signal may be used independently to determine the magnitude and/or frequency of back EMF signal. In such a situation, if any one of the determined magnitude and/or frequency is different from the speed of vehicle 1, a locked axle condition may be assumed.

Figure 5:
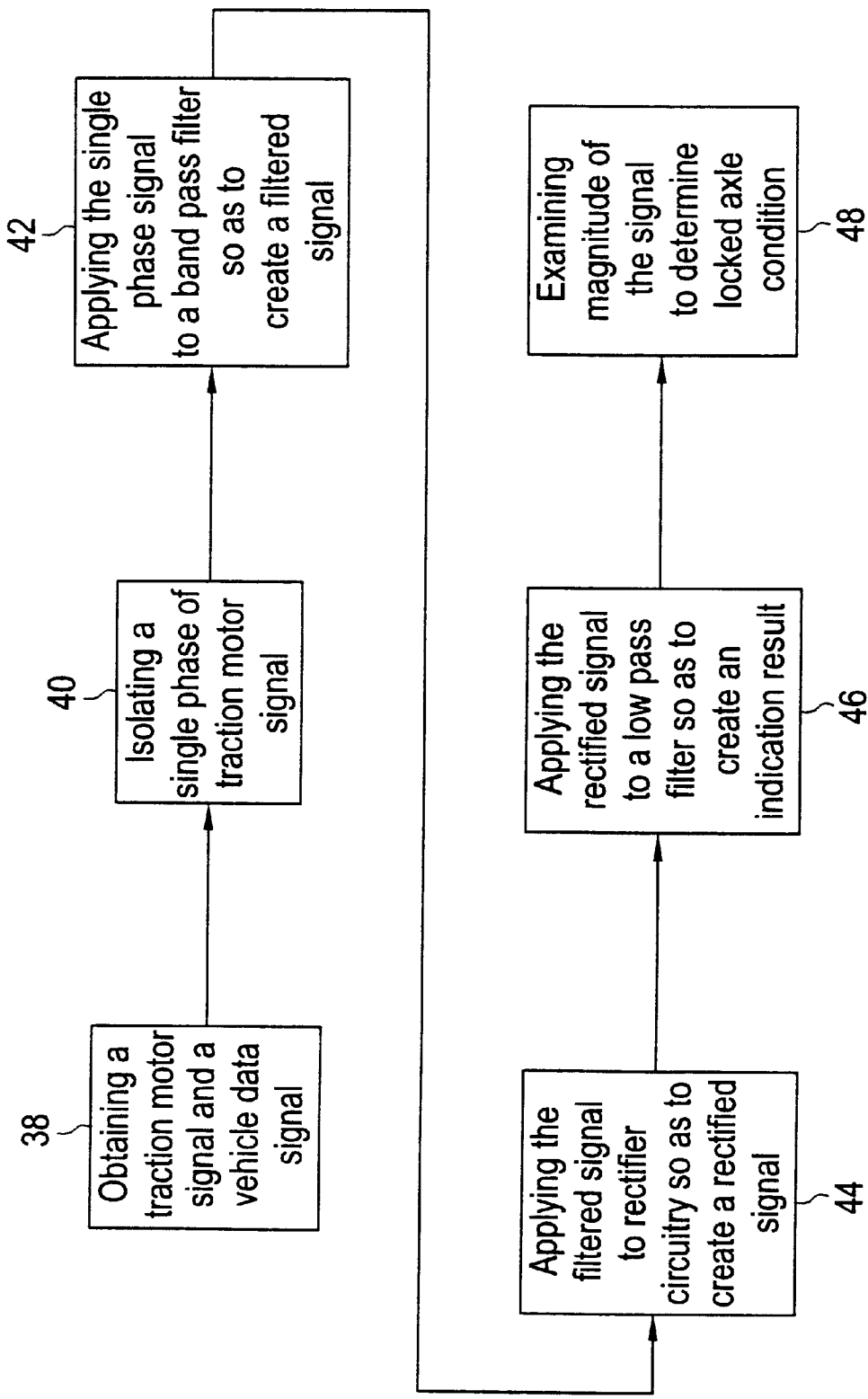
FIG. 5 is a flow diagram describing a third embodiment of a method for detecting a locked axle condition in a vehicle in accordance with an exemplary embodiment.

Referring to FIG. 5, a third embodiment is discussed. In accordance with a third embodiment, a traction motor signal and at least one vehicle data signal are obtained as in step 38. A single phase of the traction motor signal is then isolated as in step 40 and applied to a band pass filter so as to create a filtered signal responsive to the frequency of the vehicle data signals, as in step 42. In accordance with an exemplary embodiment, the parameters of the band pass filter are preferably responsive to the vehicle data signals. This allows only the expected frequency components, as established by the vehicle data signals, of the traction motor signal to be communicated into the filtered signal.

The filtered signal is then applied to a rectifier so as to create a rectified signal as in step 44 and the rectified signal is applied to a low pass filter so as to create an indication result further responsive to the magnitude of the rectified signal as shown in step 46. The magnitude of the indication result is then examined so as to determine if a locked axle condition exists as shown in step 48.

In accordance with an exemplary embodiment, vehicle data signal may include a vehicle speed signal, a reference speed signal responsive to the speed of vehicle axles and/or a reference speed tolerance. In accordance with an exemplary embodiment, band pass filter may be any band pass filtering device, method or circuitry known in the art and suitable to the desired end purpose. Also in accordance with an exemplary embodiment, the center frequency of the band pass filter is preferably responsive to the calculated, measured and/or expected speed of vehicle 1. In addition, the bandwidth of the band pass filter is preferably responsive to the frequency range expected during normal operation (i.e. non locked axle condition). Moreover, although the bandwidth and center frequency of the band pass filter is preferably adjusted via software (i.e. programmable), it is considered within the scope of the exemplary embodiment that the bandwidth and center frequency may also be adjusted via hardware or via a combination of software and hardware. It is also considered within the scope of the exemplary embodiment that the bandwidth and center frequency of the band pass filter may be dynamically adjusted in a manner responsive to the operating performance and/or condition of vehicle 1 and/or may be adjusted on a periodic basis as desired.

In accordance with an exemplary embodiment, rectifier may be any rectifying device, method or circuitry known in the art and suitable to the desired end purpose. Furthermore, low pass filter may be any low pass filtering device, method or circuitry known in the art and suitable to the desired end purpose.

Figure 6:
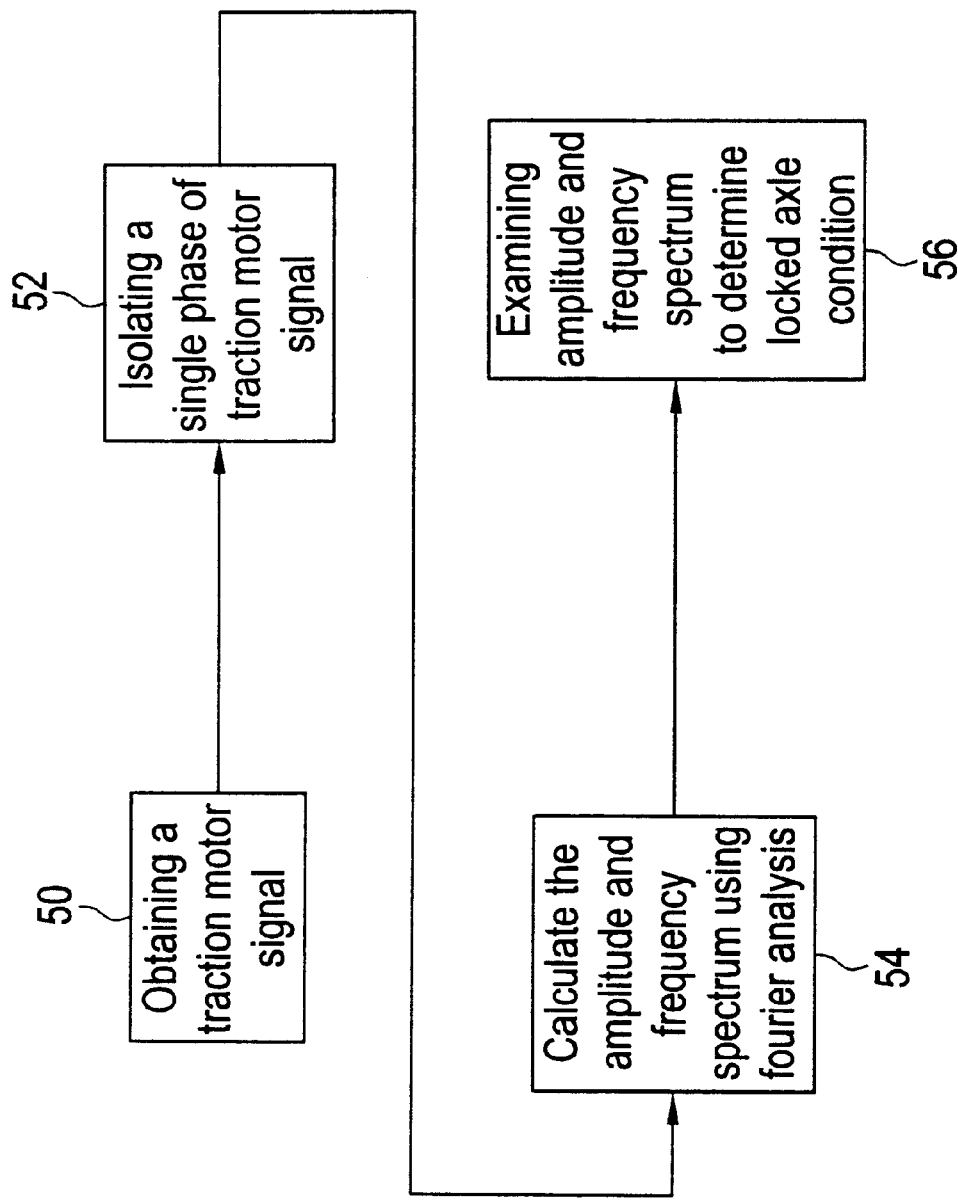
FIG. 6 is a flow diagram describing a fourth embodiment of a method for detecting a locked axle condition in a vehicle in accordance with an exemplary embodiment.

Referring to FIG. 6, a fourth embodiment is discussed. In accordance with a fourth embodiment, a traction motor signal is obtained as in step 50 and a single phase of the traction motor signal is isolated as shown in step 52. The magnitude and frequency spectrum of the single phase of the traction motor signal is then calculated using fourier analysis as in step 54. The calculated magnitude and frequency spectrum is then examined so as to determine if a locked axle condition exists as in step 56.

In accordance with an exemplary embodiment, the signal rectifier is preferably a full wave rectifier. However, it is considered within the scope of an exemplary embodiment that any rectifying device(s), circuit or method available and suitable to the desired end purpose may be used.

Processing of FIG. 2 may be implemented through central controller 6 operating in response to a computer program. In order to perform the prescribed functions and desired processing, as well as the computations therefore (e.g., the execution of fourier analysis algorithm(s), the control processes prescribed herein, and the like), the controller may include, but not be limited to, a processor(s), computer(s), memory, storage, register(s), timing, interrupt(s), communication interfaces, and input/output signal interfaces, as well as combinations comprising at least one of the foregoing. For example, the controller may include signal input signal filtering to enable accurate sampling and conversion or acquisitions of such signals from communications interfaces. It is also considered within the scope of an exemplary embodiment that the processing of FIG. 2 may be implemented by a controller located remotely from central controller 6.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Existing vehicles having reprogrammable storage (e.g., flash memory) can be updated to implement the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While invention has been described with reference to an exemplary embodiment, it will be understood by those skilled in the art that various changes may be made and equivalents may be substituted for elements thereof without departing from the scope of an exemplary embodiment. In addition, many modifications may be made to adapt a particular situation or material to the teachings of an exemplary embodiment without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for detecting a locked axle condition in a vehicle having a traction motor comprising:

obtaining a traction motor signal having at least one phase, wherein said traction motor signal is responsive to the operating condition of said traction motor;

converting said traction motor signal into a two-phase signal responsive to said traction motor signal;

processing said traction motor signal so as to create an indication result; and examining said indication result so as to determine if said locked axle condition exists.

2. The method of claim 1, wherein said processing includes applying said two-phase signal to phase locked loop circuitry so as to create a PLL signal responsive to the frequency of said two-phase signal.

3. The method of claim 2, wherein said processing further includes processing said PLL signal so as to create a two-phase unity signal responsive to the frequency of said PLL signal.

4. The method of claim 3, wherein said processing further includes combining said unity signal and said two-phase signal so as to create said indication result.

5. The method of claim 3, wherein said examining includes comparing said unity signal with said two-phase signal so as to determine the frequency error of said two-phase signal.

6. The method of claim 3, wherein said indication result is responsive to the frequency of said unity signal.

7. The method of claim 1, wherein said indication result is responsive to the frequency of said two-phase signal.

8. The method of claim 1, wherein said processing said traction motor signal includes determining the magnitude of said two-phase signal.

9. The method of claim 8, wherein said processing includes creating said indication result wherein said indication result is responsive to the magnitude of said two-phase signal.

10. A method for detecting a locked axle condition in a vehicle having a traction motor comprising:

obtaining a traction motor signal having at least one phase, wherein said traction motor signal is responsive to the operating condition of said traction motor;

processing said traction motor signal so as to create an indication result, wherein said processing said traction motor signal includes isolating a single phase of said traction motor signal; and examining said indication result so as to determine if said locked axle condition exists.

11. The method of claim 10, wherein processing said traction motor signal includes applying said single phase of said traction motor signal to a rectifier so as to create a rectified signal.

12. The method of claim 11, wherein processing said traction motor signal includes applying said rectified signal to a low pass filter so as to create an indication result responsive to the magnitude of said single phase of said traction motor signal.

13. The method of claim 10, wherein processing said traction motor signal includes processing said single phase of said traction motor signal so as to create said indication result responsive to the magnitude of said single phase of said traction motor signal.

14. The method of claim 10, wherein processing said traction motor signal includes determining the time between predefined signal event occurrences so as to create an indication result responsive to the frequency of said signal phase of said traction motor signal.

15. The method of claim 10, wherein said processing said traction motor signal includes calculating said indication result using fourier analysis, wherein said indication result is responsive to the magnitude and frequency spectrum of said traction motor signal.

16. The method of claim 10, wherein said processing said traction motor signal includes obtaining a vehicle data signal and applying said single phase of said traction motor signal to a band pass filter so as to create a band pass output signal responsive to said vehicle data signal.

17. The method of claim 16, wherein said processing said traction motor signal includes applying said band pass output signal to a signal rectifier so as to create a rectified signal.

18. The method of claim 17, wherein said processing said traction motor signal includes applying said rectified signal to a low pass filter so as to create said indication result wherein said indication result is responsive to the magnitude and frequency of said single phase of said traction motor signal.

19. A method for detecting a locked axle condition in a vehicle having a traction motor comprising:

obtaining a traction motor signal having at least one phase, wherein said traction motor signal is responsive to the operating condition of said traction motor;

processing said traction motor signal so as to create an indication result; wherein said processing said traction motor signal includes processing said traction motor signal so as to create said indication result responsive to the frequency of said traction motor signal; and examining said indication result so as to determine if said locked axle condition exists.

* * * * *